United States Patent [19]

Moore et al.

[11] 4,184,578
[45] Jan. 22, 1980

[54] DIAPHRAGM SPRING CLUTCHES

[75] Inventors: John B. Moore; Richard A. Nix, both of Leamington Spa, England

[73] Assignee: Automotive Products Limited, Leamington Spa, England

[21] Appl. No.: 920,351

[22] Filed: Jun. 29, 1978

[30] Foreign Application Priority Data

Jul. 21, 1977 [GB] United Kingdom ............... 30594/77

[51] Int. Cl.² .............................................. F16D 13/50
[52] U.S. Cl. .................................................. 192/89 B
[58] Field of Search ............................ 192/89 B, 70.27

[56] References Cited

U.S. PATENT DOCUMENTS

| | | | |
|---|---|---|---|
| 3,262,530 | 7/1966 | Maroldt et al. | 192/89 B |
| 3,313,385 | 4/1967 | Forster | 192/89 B |
| 3,858,698 | 1/1975 | Hause | 192/89 B |
| 4,114,741 | 9/1978 | Lindquist | 192/89 B |

FOREIGN PATENT DOCUMENTS

| | | | |
|---|---|---|---|
| 900389 | 5/1972 | Canada | 192/89 B |
| 943039 | 11/1963 | United Kingdom | 192/89 B |
| 1050553 | 12/1966 | United Kingdom | 192/89 B |

*Primary Examiner*—H. Hampton Hunter
*Attorney, Agent, or Firm*—Kemon & Estabrook

[57] ABSTRACT

In a diaphragm spring clutch cover assembly one of the annular fulcra for the diaphragm spring is cushioned in order to supplement or replace the cushioning normally incorporated between the friction facings of the driven plate. The cushioning in the fulcrum includes a wavy ring some of whose undulations are of greater height than the others to give a progressive engagement of the clutch.

6 Claims, 5 Drawing Figures

DIAPHRAGM SPRING CLUTCHES

The invention relates to diaphragm spring clutch cover assemblies of the kind which includes a pressure plate, a cover and a diaphragm spring having a plurality of radially inwardly directed fingers, the diaphragm spring acting between a first annular fulcrum on the pressure plate and a second annular fulcrum on the cover. In use the assembly is secured to a driving member, such as a motor vehicle engine flywheel, so that a driven plate is clamped between the pressure plate and the driving member by the load of the diaphragm spring, the driven plate being released by an axial effort applied to the inner ends of the diaphragm spring fingers.

It has been proposed in British Pat. Nos. 943,039, 1,050,553 and 1,453,287 to incorporate means which provides a degree of axial flexibility or cushioning into one of the annular fulcra in a diaphragm spring clutch of the kind referred to, this cushioning means being intended to supplement or replace the cushioning which is normally provided between the friction facings of the driven plate, However, it has been difficult to provide cushioning means in the clutch cover assembly which is simple to manufacture and install and yet which provides a subjectively acceptable clutch engagement when installed on a motor vehicle.

The invention provides a diaphragm spring clutch cover assembly comprising a pressure plate, a cover, a diaphragm spring having a plurality of radially inwardly directed fingers and acting between a first annular fulcrum on the pressure plate and a second annular fulcrum on the cover, and cushioning means in one of the annular fulcra, the cushioning means including a wavy ring having undulations which extend parallel to the axis of the clutch, some of the undulations being of greater amplitude than others.

The invention will now be described by way of example and with reference to the accompanying drawing of which:

Figure 1:
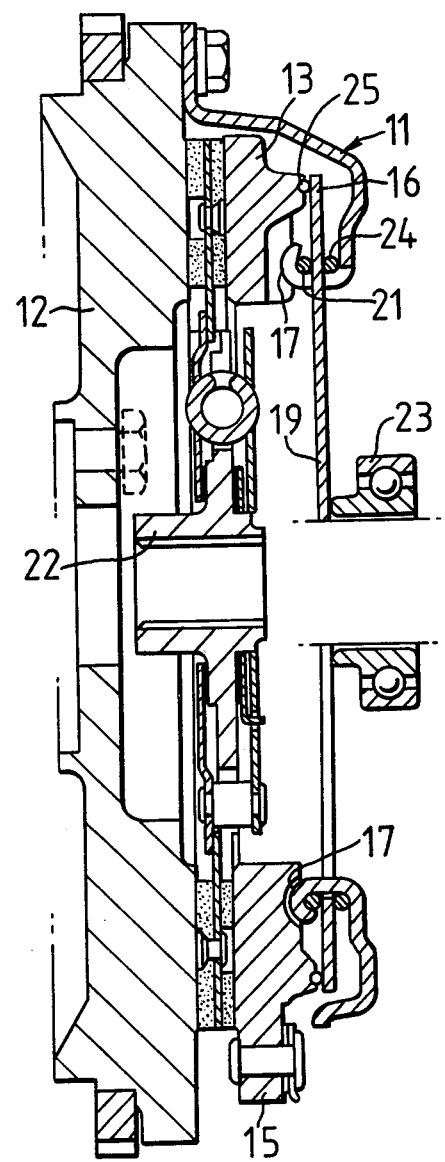
FIG. 1 is a cross-sectional elevation of a clutch cover assembly according to the invention connected to an engine flywheel and with a driven plate and clutch release bearing shown also.
Figure 2:
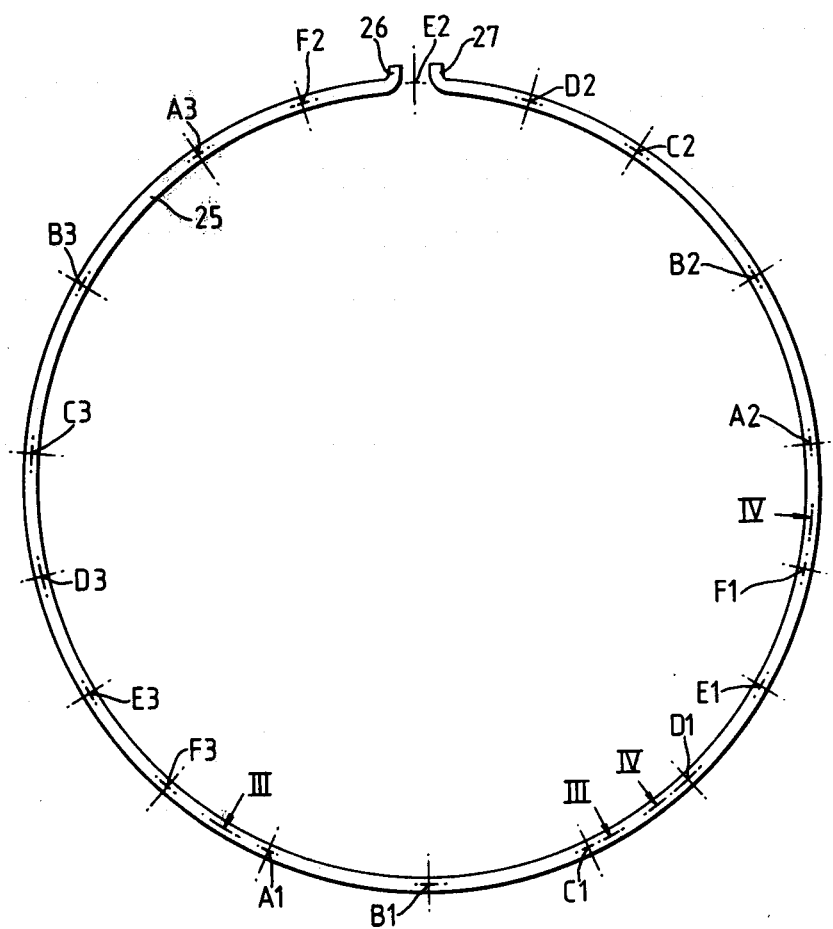
FIG. 2 is a view of a fulcrum ring which is a part of the assembly of FIG. 1.

The clutch cover assembly ahown in FIG. 1 includes a pressed steel cover 11 bolted to an engine flywheel 12. A pressure plate 13 is driven conventionally by three sets of tangental straps (not shown) which are rivetted to three lugs 15 on the pressure plate and to the cover 11. The straps are pre-deflected on assembly so that they exert a biasing load on the pressure plate 13 which tends to urge the pressure plate 13 away from the flywheel 12.

A diaphragm spring 16 having radially inwardly extending fingers 19 acts between the pressure plate 13 and the cover 11 to clamp a driven plate 22 between the pressure plate 13 and the flywheel 12. The diaphragm spring 16 acts between a first annular fulcrum on the pressure plate 13 provided by a wavy ring 25 of circular section wire and a second annular fulcrum on the cover 11 provided by a flat ring 24, also of circular section wire. The wavy ring 25 is located in an annular groove in the pressure plate 13 whilst ring 24 is located by tabs 17 which extend between the diaphragm spring fingers 19 and also serve to locate a third fulrum ring 21.

The driven plate 22 is released by axial movement towards the flywheel 12 of a clutch release bearing 23 which pushes on the radially inner ends of the diaphragm spring fingers 19 to relieve the clamp load of the pressure plate 13 towards the flywheel 12. The biassing load of the drive straps ensures that the pressure plate 13 moves away from the flywheel 12 by an amount which frees the driven plate 22.

For smooth re-engagement of the driven plate 22, it is necessary to provide some form of cushioning which ensures that the clamp load increases progressively over a substantial range of movement of the release bearing 23 away from the flywheel 12. This is achieved by the undulations of the wavy ring 25, these undulations extending parallel to the axis of the clutch as shown in FIGS. 2 to 5.

Figure 3:
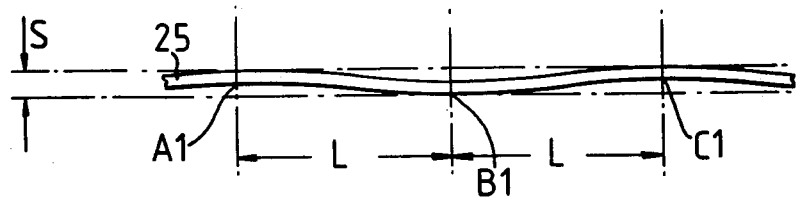
FIG. 3 is a projected development of an arcuate portion of the ring shown in FIG. 2, between the arrows III—III.
Figure 4:
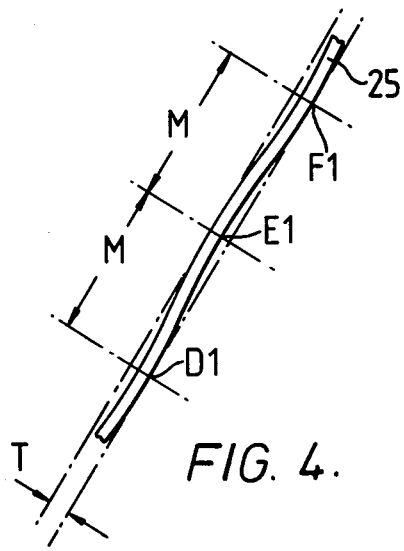
FIG. 4 is a projected development of another arcuate portion of the ring shown in FIG. 2, between the arrows IV—IV.
Figure 5:
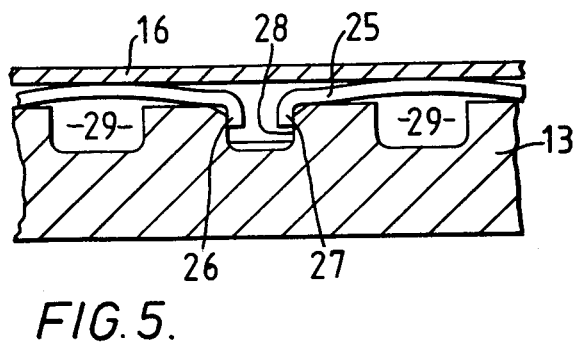
FIG. 5 is a scrap view showing a developed arcuate cross-section of the clutch cover assembly shown in FIG. 1.

The developed shape of the wavy ring 25 is generally sinusoidal, having what may conveniently be described as troughs at radial intersections A1, C1, E1, A2, C2, E2, A3, C3, E3 and peaks at radial intersections B1, D1, F1, B2, D2, F2, B3, D3, F3. These peaks and troughs are relative to a hypothetical vertical axis corresponding to the axis of rotation of the clutch. FIG. 3 shows a part developed view of the ring including trough A1, peak B1 and trough C1, the peaks and troughs appearing inverted by virtue of the use of first angle projection. FIG. 4 shows a part developed view including peak D1, trough E1 and peak F1. The amplitudes of the undulations are such that the axial width S, between peaks B1 and troughs A1 and C1 shown in FIG. 3 is greater than the axial width T between peaks D1 and F1 and trough E1 shown in FIG. 4. Furthermore, the circumferential wavelength from trough A1 to trough C1 is greater than that from peak D1 to peak F1. Hence the portion of ring shown in FIG. 3 is less stiff in axial compression than the portion shown in FIG. 4, but the portion shown in FIG. 3 comes into effect before the portion shown in FIG. 4 during clutch engagement.

The pattern of convolutions is repeated so that portions A2-B2-C2 and A3-B3-C3 are identical to A1-B1-C1 and portions D2-E2-F2 and D3-E3-F3 are identical to D1-E1-F1, the identical portions being equispaced. Trough C1 is separated from peak D1 by the distance M and peak F1 is separated from troughs A2 by the same amount in the embodiment shown. In general the selection of these separations of troughs and peaks is a matter of detail design to suit a particular installation. However, the ring is interrupted at trough E2 by the formation of two ears 26 and 27 which locate in a recess 28 (FIG. 5) in the pressure plate 13 to provide circumferential location for the ring 25. This allows the use of radial slots 29 in the pressure plate 13 which are circumferentially spaced to lie opposite the peaks B1, D1, F1, B2, D2, F2, B3, D3, F3 without affecting the operation of the clutch, these slots 29 being provided to promote the centrifugal flow of cooling air. One of the ears 26 and 27 may be omitted. Alternatively the ring may be located in the groove by a short peg.

The provision of one series of undulations which have a relatively low stiffness but greater axial amplitude than another set which has a relatively high stiffness but lower axial amplitude gives a smooth engagement characteristic to the clutch, so that subjectively a clutch cover assembly according to the invention used in conjunction with a non-cushioned driven plate behaves in the same way as a conventional cover assembly used with a cushioned driven plate.

If required, the undulations can be of three or more different axial amplitudes and/or circumferential wavelengths. The wavy ring can also be fitted to the cover, e.g. in place of ring 24. The invention is also applicable to pull type diaphragm spring clutches, in which case the wavy ring can be fitted between the spring and the pressure plate and/or between the spring and the cover.

We claim:

1. A diaphragm spring clutch cover assembly comprising a pressure plate, a cover, a diaphragm spring having a plurality of radially inwardly directed fingers and acting between a first annular fulcrum on the pressure plate and a second annular fulcrum on the cover and cushioning means in one of the annular fulcra including a wavy ring having undulations which extend parallel to the axis of the clutch, wherein some of the undulations are of greater amplitude than others.

2. The clutch cover assembly of claim 1, wherein the circumferential wavelength of the undulations of greater amplitude is greater than the circumferential wavelength of the other undulations.

3. The clutch cover assembly of claim 1, wherein the pressure plate has an annular groove in which the wavy ring is supported.

4. The clutch cover assembly of claim 3, further comprising means for circumferentially locating the wavy ring in said annular groove.

5. The clutch cover assembly of claim 4, wherein the means for circumferentially locating the wavy ring comprises an ear formed integrally with the wavy ring and a recess in the pressure plate into which the ear is located.

6. The clutch cover assembly of claim 4, wherein the pressure plate has radial slots in the side adjacent the annular groove to promote the flow of cooling air, the slots being circumferentially spaced to lie opposite the peaks of the ring which are adjacent the diaphragm spring.

* * * * *